United States Patent [19]

Rumpp et al.

[11] 4,006,787
[45] Feb. 8, 1977

[54] DRILLING TOOL WITH DRILL AND RECEIVING ELEMENT

[75] Inventors: Gerhard Rumpp, Inning; Karl-Heinz Gärtner, Munich; Wilm Krüger, Puchheim, all of Germany

[73] Assignee: Hilti Aktiengesellschaft, Schaan, Liechtenstein

[22] Filed: Aug. 28, 1975

[21] Appl. No.: 608,688

[30] Foreign Application Priority Data

Sept. 19, 1974  Germany .......................... 2444899

[52] U.S. Cl. .............................. 173/132; 64/30 D; 279/1 Q; 279/1 SJ; 403/41
[51] Int. Cl.² ................... B25D 17/02; E21C 13/06
[58] Field of Search ............ 403/41; 279/15 J, 1 Q; 408/221; 64/30 R, 30 E, 30 A, 30 D, 30 C; 173/132

[56] References Cited

UNITED STATES PATENTS

| | | | |
|---|---|---|---|
| 2,164,485 | 7/1939 | Yantis | 64/30 D |
| 3,208,316 | 9/1965 | Scribner | 64/30 C X |
| 3,406,583 | 10/1968 | Baier | 64/30 R X |
| 3,844,138 | 10/1974 | Samiran | 64/30 E |
| 3,893,554 | 7/1975 | Wason | 64/30 E X |
| 3,898,816 | 8/1975 | Cindahl | 64/30 R X |

*Primary Examiner*—Ernest R. Purser
*Assistant Examiner*—William F. Pate, III
*Attorney, Agent, or Firm*—Toren, McGeady and Stanger

[57] ABSTRACT

A drilling tool consists of a drill and a tubular shaped receiving part fitted onto the trailing end of the drill. The outer surface of the receiving part is shaped to fit into the chuck or retainer of a drilling device which rotates the drill. The inner surface of the receiving part and the juxtaposed surface on the trailing end of the drill are in locking engagement, however, under certain torque conditions the locking engagement will be released so that the receiving part can rotate relative to the drill. Preferably, the locking engagement is established by deflectable projections formed on at least one of the receiving part and the drill which seat into recesses formed on the juxtaposed surface of the other. Passageways are provided between the trailing end of the drill and the receiving part.

12 Claims, 9 Drawing Figures

DRILLING TOOL WITH DRILL AND RECEIVING ELEMENT

SUMMARY OF THE INVENTION

The present invention is directed to a drilling tool which includes a drill and a tubular shaped receiving part fitted on to the trailing end of the drill and, more particularly, it concerns a locking engagement between the receiving part and the drill which is released when particular torque conditions are developed during drilling operations.

Drilling tools such as used in hammer drills for work on rock, concrete and masonry are subject to a torque and also to axially directed blows. The axially directed blows, caused by a reciprocating hammering action, are directed against the trailing end of the drill by a striking mechanism within the hammer drill. The torque causing the rotational movement of the drill, is transmitted from the hammer drill via a tool retainer which executes a rotary movement and transmits it to the drill. To provide a form-locking connection between the tool retainer on the hammer drill and the drill itself, various shapes are provided on the trailing end of the drill, for example, a round cross-section with outwardly projecting engaging elements, a polyhedral cross-section, splined connections and the like are known.

Due to the non-uniform character of the material to be worked, which is particularly noticeable in concrete due to embedded reinforcement material, the transmission of torque to the drill may create considerable problems. In fact, if the drill is hindered in its rotary movement either suddenly or to a severe extent, it may result in damage to or breakage of the hammer drill. Furthermore, the reaction generated in the hammer drill due to the interference with the rotational drive, may cause considerable hazards to the operator.

In known hammer drills it has been attempted to eliminate these disadvantages by installing a safety device to protect against overload, which device is of a predominately mechanical nature. One such device which is well known is a slip clutch. However, a slip clutch can only be adjusted for a certain torque, determined, as a rule, by the largest diameter of the drills used. Accordingly, all drills or drilling tools of a smaller diameter are not protected, because twisting moments can be developed in such drills which are less than the adjusted torque but sufficient to cause destruction of the drill. Further, soft-metal or plastic coverings have been provided on the drill for engagement within the retainer of the device rotating the drill and, while such means are intended to have a damping effect on the torque peaks occurring under an overload, the results obtained have not been sufficiently satisfactory for the elimination of the above disadvantages.

It is the primary object of the present invention to provide a receiving part on the end of the drill fitted into a drilling device which provides an effective overload protection for avoiding the disadvantages previously experienced where rotational movement is transmitted to the drill but the drill is held against such rotation.

In accordance with the present invention, the trailing end or shank portion of a drill is fitted within a receiving part and the surface of the receiving part and the trailing end are shaped to afford at least a partial locking engagement consisting of projections on one and recesses on the other which permit transmission of rotation to the drill under normal conditions. The projections on at least one of the two parts are elastically deflectable to permit release of the locking engagement.

In accordance with the present invention, the drilling tool consists of a drill and a receiving part. The drill is an axially elongated member having a leading end shaped to cut into a material and a trailing or shank end. The receiving part is fitted on to the shank end of the drill and the interengagement between the receiving part and shank end is such that it permits relative rotation between the two parts when a certain torque has been developed during drilling operations. For the transmission of torque to the drilling tool, the transverse cross-section of the receiving part is shaped to correspond with the transverse shape of the tool retainer within the drill hammer or other drilling device used. Accordingly, the transverse cross-sectional shape of the receiving part may, for example, be in the form of a polyhedral, a polygon, a splined-shaft configuration or other similar shapes. The axially directed blows of the striking mechanism in the drilling device are directed against the end of the drill which extends through the receiving part. As a result, the receiving part is not exposed to impact stress. To fix the receiving part in the axial direction on the shank end of the drill, a cap, collar or the like, may be provided on the receiving part and this additional part then assumes the transmission of the impact forces to the shank end of the drill.

In forming the receiving part, materials or material combinations are provided whose hardness may be greater or smaller than the hardness of the material forming the shank end of the drill. Elastically deflectable projections are provided between the receiving part and the shank end of the drill which engage within recesses. These deflectable projections may be formed on either or both of the juxtaposed surfaces of the receiving part and the shank end of the drill. When excessive stresses act on the drilling tool, the projections yield out of the recesses and permit relative rotation between the receiving part and the drill itself. It is important that the projections only undergo an elastic deformation so that the projections can again fully and effectively engage within the recesses when the excessive stresses are released so that rotational forces can be transmitted through the receiving part to the drill. There must be no destruction of the elastically deflectable projections as they are displaced out of and move relative to the recesses.

This overload protection incorporated into the drilling tool has the advantage that its response is immediate, without first having to stop the number of rotating machine parts. As a result, undesirably high stresses acting on the drill are avoided as soon as such stresses occur and any bucking action on the drilling device which could affect the operator are avoided. Also passageways can be provided between the drill and the receiving part.

Because of the dimensions of a drilling tool, it has proved advantageous to arrange the elastically deflectable projections to extend substantially radially with respect to the axis of the drill which passes through the center of the opening in the receiving part. This arrangement makes the parts easy to manufacture. An important factor is that the shank end of the drill need not have a diameter greatly different from the rest of the drill so that production costs are not adversely affected.

In one embodiment of the invention, the elastically deflectable projections may be formed in a unitary arrangement with the receiving part. This particular construction affords an economically advantageous manufacture of the receiving part. However, the elastically deflectable projections may also be formed separately and anchored into the body of the receiving part. For example, the projections can be made of sheet metal, which can be especially inexpensively mass produced, with the sheet metal projections then anchored into the receiving part, which may be formed of a plastic material. If the entire receiving part is formed of sheet metal, the outer shape of the part preferably corresponds to the transverse shape of the tool retainer in the drilling device or hammer drill. In such an arrangement the elastically deflectable projections may be provided by the sheet metal receiving part in the form of a unitary construction. Alternatively, several sheet metal shaped members may be fitted one into the other with the outermost member having a shape corresponding to the tool retainer and with the yielding projections arranged innermost extending substantially radially toward the axis of the drill.

In another embodiment of the invention, the receiving part may be produced as a shaped member formed of plastic. The outer contour of the receiving part is conveniently shaped to correspond to the transverse shape of the tool retainer in the drilling device or hammer drill. The inner contour of the receiving part may be provided with deflectable projections formed unitarily with the part and, therefore, formed of plastic material. The deflectability of the projections can be ensured by the inherent elasticity of the plastic material used, or alternatively, the receiving part can be provided with axially extending slots which permit radial expansion in consideration of the outer configuration used for the receiving part. An essential economical feature of the present invention is that the same tool retainer can be used for drills of various diameters. The size differences can be compensated by the cross-sectional shape of the shank end of the drill or by the dimensions of the deflectable projections. This characteristic is particularly favorable when viewed against the cost of production and stock-keeping for drilling tool manufacturers.

As already described, the shank end of the drill passes through the tubular or sleeve-type receiving part. For effectively transmitting impact blows to the drill, its shank end preferably projects rearwardly from the trailing end face of the receiving part. To ensure the axial positioning of the receiving part on the shank end of the drill, it is preferable to provide abutment means on the drill for securing the receiving part. The abutment means may be in the form of shoulders which project outwardly from the shank end of the drill. When two shoulders are provided, the shank end of the drill on which the receiving part fits, is located between the shoulders. Further, the shoulders may be provided at the same diameter as the shank end and by correspondingly shaping the receiving part to be secured by the shoulders.

Another possibility for axially positioning the receiving part on the shank end of the drill, is to form one or more grooves in the shank end with the inner contour of the receiving part seated within the grooves. Alternatively, separate engaging or abutment means can be seated within the grooves in the form of rings, disks or the like for positioning the receiving part between such means.

An appropriate cross-sectional shape of the shank end of the drill, differing from a circular shape, has proved to be a serrated shape with the serrations disposed in parallel in the axial direction so that a series of alternating projections and recesses are formed about the shank end. With this particular configuration the recesses provide a reliable engagement for the deflectable projections on the receiving part. With this serrated shape on the shank end, the torque values at which the overload protection occurs can be controlled in a simple manner, for example, by providing an asymmetrical form or the like. Further, the control of the overload torque can be obtained by a matched combination of the shapes provided by the serrations on the shank end and the engaging projections on the receiving part.

As a rule, the shank end of the drill having the serrated shape is formed of a harder material than the deflectable projections, accordingly, where the opposite flanks of the recesses in the serrated shape extend substantially tangentially to each other has been found to be advantageous in preventing damage or early wear of the projections. With such a serrated shape, even at a prolonged response to the overload protection with relative rotation of the receiving part and the drill, the elastically deflectable projections are not subject to excessive load leading to possible destruction.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive material in which there are illustrated and described preferred embodiments of the invention.

DETAIL DESCRIPTION OF THE INVENTION

Figure 1:
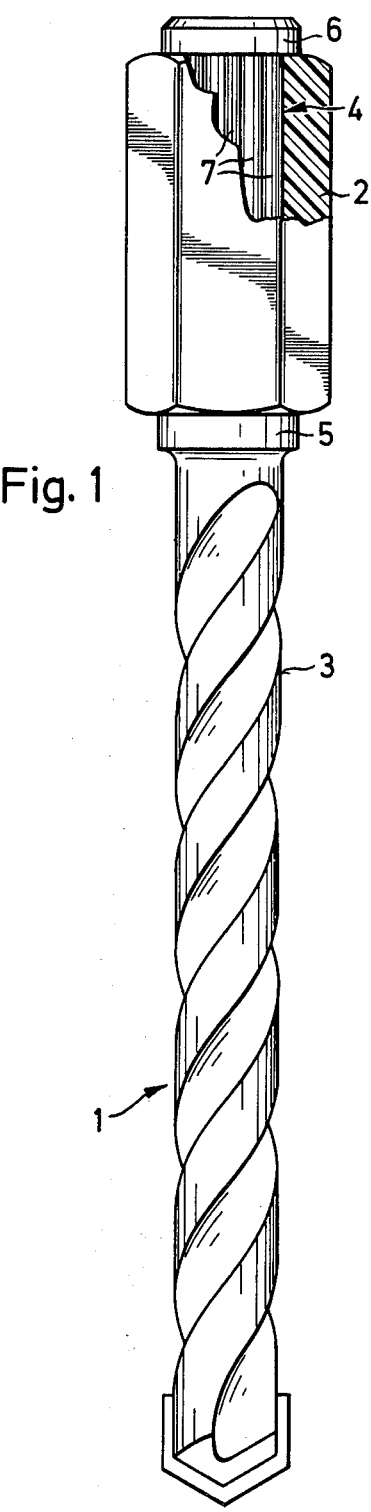
FIG. 1 is an elevational view, partly in section, of a drilling tool formed in accordance with the present invention and including a drill and a receiving part.
Figure 2:
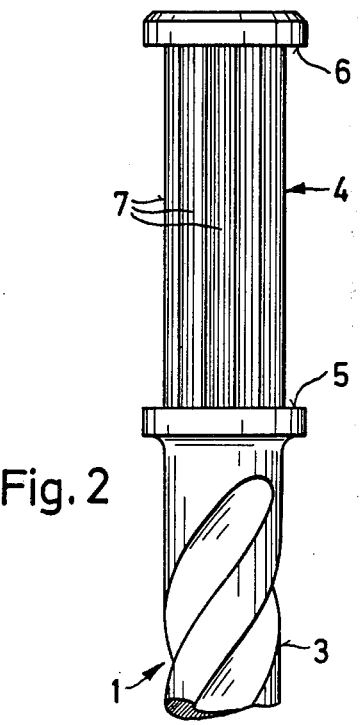
FIG. 2 is an elevational view of a portion of the drill shown in FIG. 1.

In FIG. 1 a drilling tool is illustrated consisting of a drill 1 and a receiving part 2. The lower end of the drill, as viewed in FIG. 1, is its leading end, that is, the end which is directed against a material to be drilled, while its upper end is its trailing end. The working or drilling part 3 of the drill extends from its leading end for a substantial extent of its axial length toward the trailing end. The shank end 4 of the drill 1 extends from the trailing end of the drill to the trailing end of the working part 3. As can be seen best in FIG. 2, in which only the shank end 4 is shown with a small portion of the trailing end of the working part, a pair of shoulders 5, 6 extend outwardly from the shank end, and the shank end between the shoulders has a serrated shape when viewed in transverse section consisting of alternating projections and recesses. The shoulders 5 and 6 provide abutments for securing the receiving part 2 on the shank end against axial displacement.

Figure 3:
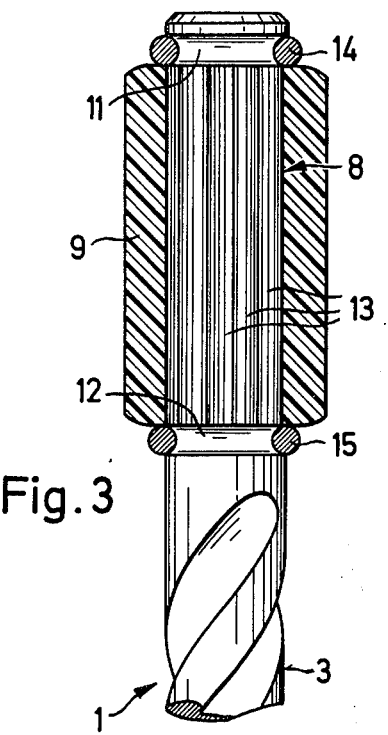
FIG. 3 is another embodiment of a drilling tool incorporating the present invention.

In FIG. 3 another form of the shank end 8 of the drill is illustrated with a receiving part 9 mounted on the shank end. The shank end 8 has two annular grooves 11 and 12 located at each of its opposite ends with a serrated surface 13 extending axially between the grooves. The axial abutments for the receiving part 9 are provided by spring rings 14, 15 fitted into the grooves 11, 12. Instead of the spring rings 14, 15, any other engagement elements can be used, such as spring disks and the like. Further, it is also possible with a corresponding design of the receiving part 9, to provide only one securing element, which may, for example, be of a multi-part design, in which case only one groove is required in the shank end 8 of the drill.

Figure 4:
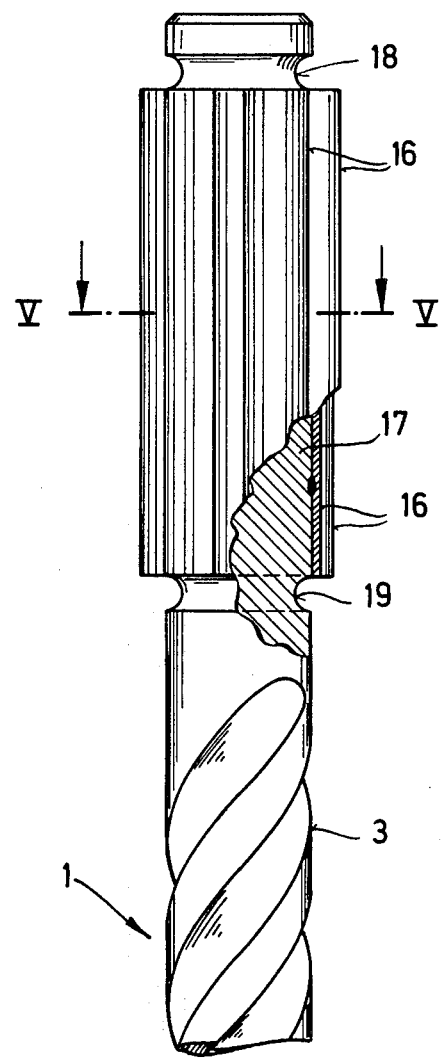
FIG. 4 is a partial elevational view, partly in section, of a drill embodying the present invention.
Figure 5:
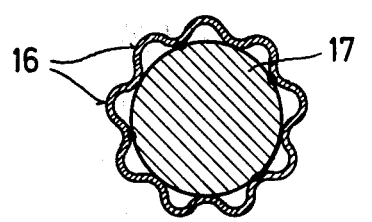
FIG. 5 is a sectional view taken along the line V—V in FIG. 4.

In FIGS. 4 and 5 a special arrangement for the serrated shape on the shank end of the drill is shown. Accordingly, the shank end of the drill is formed of a two-part construction, a sheet metal part 16 having the undulating serrated shape fastened on to the shank end 17 of the drill. The attachment of the sheet metal part 16 to the shank end 17 can be effected in various ways, for example, by spot welding, gluing, by entraining elements or the like. This method of providing the serrated shape to the shank end 17 has the advantage that it allows a very economical production of the drill. The securement of the receiving part which laterally encircles the sheet metal part 16 can be effected by separate securing means which engage in grooves 18, 19 at the opposite ends of the shank end 17. Another advantage of this arrangement is that by virtue of the special material properties of the sheet metal part 16, which are independent of the properties of the material forming the drill, by selecting the materials of the receiving part and the sheet metal part 16, the wear and sliding properties of these two parts can be influenced within wide limits.

In FIGS. 6 to 9 various constructions of the drilling tool embodying the present invention are illustrated, with the shank end of the drill and the receiving part being shown in transverse section. These four embodiments exhibited in FIGS. 6 to 9 have the common feature that the shank end 20 of the drill in each figure has a serrated outer surface 21 affording alternating lands and grooves or projections and grooves, and the elastically deflectable projections associated with the receiving part engage within the recesses formed by the serrated shape 21.

Figure 6:
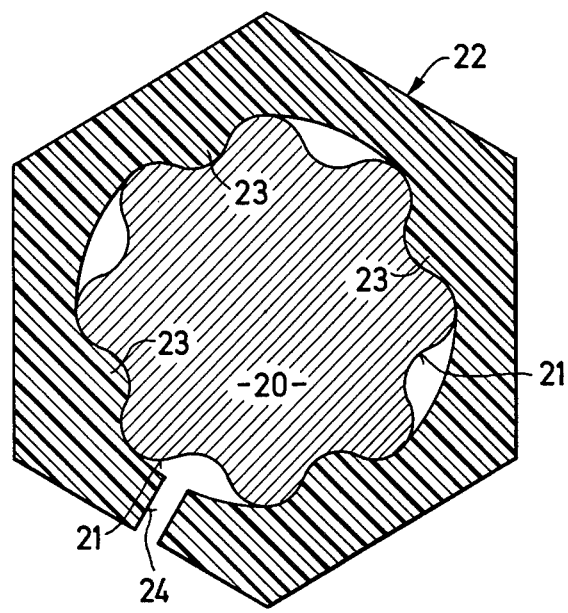
FIG. 6 is a transverse sectional view through another embodiment of a drilling tool incorporating the present invention with the parts of the drilling tool being shown on a larger section than in FIGS. 1–5.

In FIG. 6 a receiving part 22 formed of plastic has inwardly extending projections 23 directed toward the axis of the opening through the receiving part and, as a result, toward the axis of the drill. To improve the elastic deflectability of the projections 23, the entire receiving part 22 is made radially expandable by an axially extending slot 24. The arrangement of the slot 24 depends largely on the inherent elasticity of the material used for the receiving part 22. For the absorption of the torque transmitted from the drilling device, the outer surface of the receiving part 22 has a hexagonally shaped configuration. In the arrangement of FIG. 6 the projections 23 on the receiving part fit into the recesses formed by the serrated shape 21 of the shank end. Similarly, the projections formed by the serrated shape of the shank end fit into recesses in the receiving part defined between adjacent projections 23.

Figure 7:
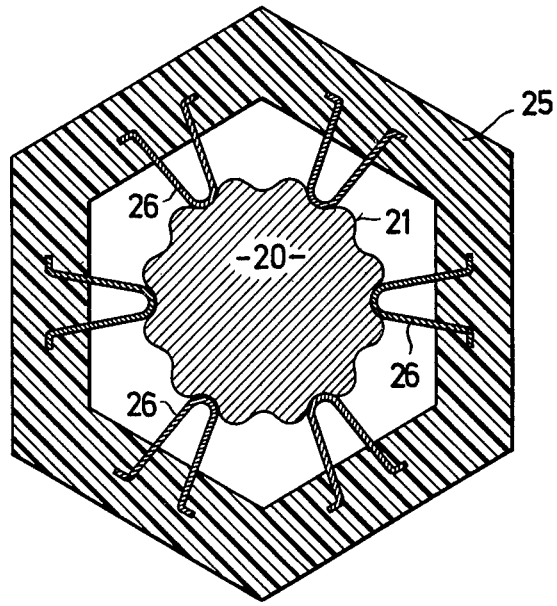
FIG. 7 is a sectional view, similar to FIG. 6, illustrating another form of a drilling tool incorporating the present invention.

In FIG. 7 a receiving part 25 formed of a plastic material is shown, and the outer shape of the receiving part is hexagonal for seating within a similarly shaped tool retainer in a drilling device. While in FIG. 6 the projections 23 are formed integrally with the body of the receiving part 22, in FIG. 7 elastically deflectable projections 26 formed of sheet metal are anchored within the body of the receiving part. The sheet metal projections 26 have a generally V-shaped configuration with the apex directed radially inwardly toward the center or axis of the drill. The projections 26 seat within the recesses provided by the serrated shape 21 of the shank end 20 of the drill.

Figure 8:
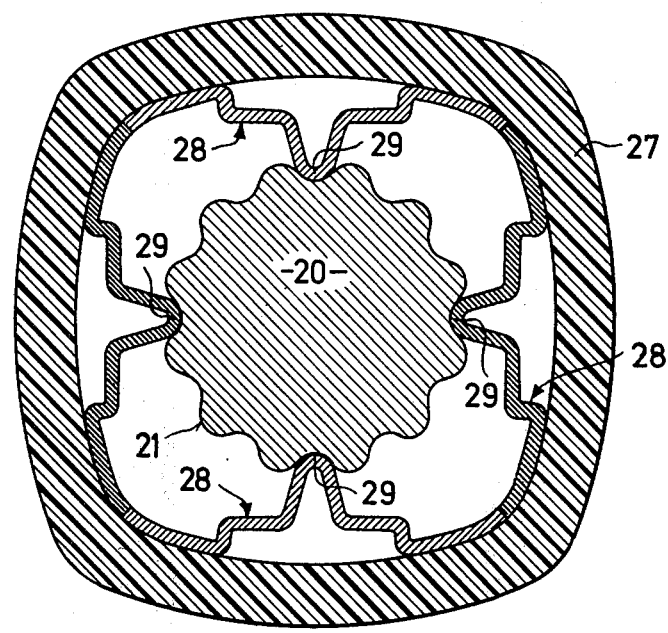
FIG. 8 is a sectional view similar to FIG. 6 displaying another embodiment of a drilling tool in accordance with the present invention.

In FIG. 8 another drilling tool is illustrated with a plastic material receiving part 27 with the shape of its outer surface being generally square but the outer surfaces being slightly convex, which shape is adapted to the tool retainer in a drilling device for transmitting the torque or rotational drive to the drilling tool. A sheet metal member 28 formed of a number of individual parts, is fitted in form locking engagement with the inner surface of the receiving part 27 and, in addition to the surfaces which engage the inner part of the receiving part, the sheet metal member has elastically deflectable projections 29 which extend inwardly into the recesses formed in the serrated shape 21 on the outer surface of the shank end 20 of the drill. The engagement between the receiving part 27 and sheet metal member 28 in FIG. 8 is intended only as an example, since other types of engagement could be used such as that shown in FIG. 7.

Figure 9:
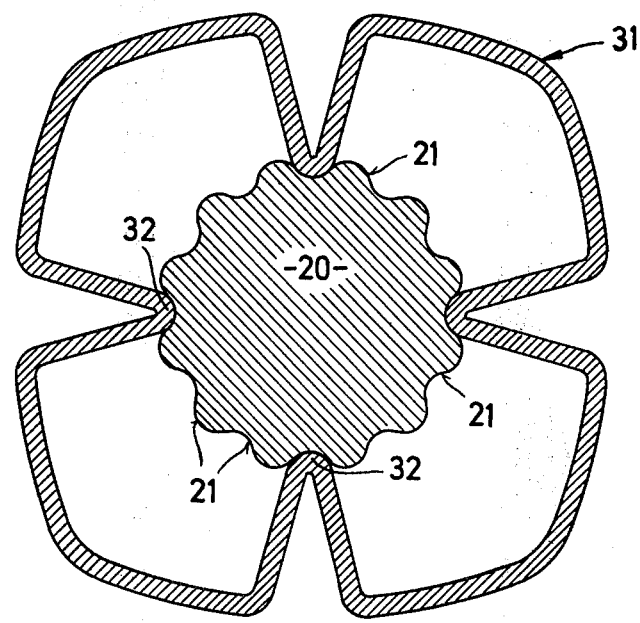
FIG. 9 is a sectional view similar to FIG. 6 of still another embodiment of a drilling tool incorporating the present invention.

In FIG. 9 a receiving part 31 having four lobes is formed of sheet metal. The radially outer surface of each lobe of the receiving part 31 forms a part of a shape similar to the exterior surface of the receiving part 27 shown in FIG. 8. This exterior shape of the receiving part 31 permits engagement within a similarly shaped tool retainer in a drilling device. The receiving part 31 has integrally formed elastically deflectable projections 32 which extend radially inwardly into the recesses formed in the serrated shape 21 on the shank end 20 of the drill.

By designing the elastically deflectable projections and the serrated shape on the shank end of the drill, the maximum torque to be transmitted between the receiving part and the drill can be controlled, both where the projections are formed integrally with the receiving part and where the projections are separate members anchored in or secured within the receiving part. The control of the torque to be transmitted is, of course, not limited to those forms where the elastically deflectable projections are provided on the receiving part. Torque control can also be achieved with the deflectable projections formed on the shank end of the drill or the projections can be provided on both of the receiving part and the shank end.

With the open spaces formed between the inner surface of the receiving part and the outer surface of the shank end of the drill, passageways extend from the trailing end of the drilling part of the drill to the trailing end of the shank end of the drill.

While specific embodiments of the invention have been shown and described in detail to illustrate the application of the inventive principles, it will be understood that the invention may be embodied otherwise without departing from such principles.

What is claimed is:

1. A drilling tool comprising an axially elongated drill having a leading or cutting end and a trailing end, the leading end effecting the cutting or drilling action when it is placed against the material to be drilled and the trailing end being insertable into the retainer on a drilling device such as a drill hammer or the like, said drill having an axially extending cutting portion extending from its leading end toward its trailing end and an axially extending shank portion extending from its trailing end toward its leading end, an axially extending tubular shaped receiving member laterally encircling at least a part of said shank portion, said receiving member having an inner surface and an outer surface, said shank portion having an axially extending outer surface facing toward the inner surface on said receiving part, wherein the improvement comprises that the trailing end of said shank portion projects outwardly from the trailing end of said receiving member, a first axially extending part of the inner surface of said receiving part and a first axially extending part of the outer surface of said shank portion are disposed in engagement and a second axially extending part of the inner surface of said receiving part and a second axially extending part of the outer surface of said shank portion are disposed in spaced relation forming therebetween at least one axially extending passageway opening between the trailing end of said shank portion and the trailing end of said cutting portion, at least one of the first part of the inner surface of said receiving part and the first part of the outer surface of said shank portion comprises a projection extending into contact with the first part of the surface it faces and the first part of the surface it faces having a recess into which the projection seats, a plurality of said projections form the first part of the inner surface of said receiving port with said projections disposed in spaced relation and extending radially relative to the axis of said shank portion into recesses in said shank portion, and said projections being elastically deflectable so that under a certain torque said projections are deflected out of the recesses permitting the receiving part to rotate relative to the shank portion.

2. A drilling tool, as set forth in claim 1, wherein said projections are formed integrally with said receiving part.

3. A drilling tool, as set forth in claim 1, wherein said projections are separate from and are secured to said receiving part.

4. A drilling tool, as set forth in claim 1, wherein said projections are formed of sheet metal and have a generally V-shaped configuration in section transverse to the axis of said drill with the apex of the V-shaped configuration disposed in contacting engagement with the first part of the outer surface of said shank portion.

5. A drilling tool, as set forth in claim 1, wherein each said projection is a separate member angularly spaced apart about the inner surface of said receiving part from the adjacent said projections.

6. A drilling tool, as set forth in claim 1, wherein said receiving part is formed as a unitary sheet metal section forming the first part and second part of the inner surfaces of said receiving part.

7. A drilling tool, as set forth in claim 1, wherein said receiving part is formed of a plastic material and said projections are formed integrally with said receiving part of the plastic material.

8. A drilling tool, as set forth in claim 1, wherein abutment means are provided on said shank portion of said drill for securing said receiving part thereon against displacement in the axial direction.

9. A drilling tool, as set forth in claim 1, wherein the outer surface of said shank portion comprises a plurality of alternating projections and recesses extending in the axial direction of said shank portion so that the outer surface of said shank portion is provided with a serrated shape.

10. A drilling tool, as set forth in claim 9, wherein the inner surface of said receiving part comprises alternating said projections and recesses extending in the axial direction of said receiving part with said projections forming the first part of the inner surface of said receiving part.

11. A drilling tool, as set forth in claim 10, wherein said projections on said receiving part extend into contact with said recesses on the outer surface of said shank portion and said projections on the outer surface of said shank portion extend into contact with said recesses on the inner surface of said receiving part.

12. A drilling tool, as set forth in claim 1, wherein said receiving part is formed of a plastic material having said projections formed integrally therewith and having a slot extending in the axial direction of said receiving part for the axial length thereof and said slot also extending from the outer surface to the inner surface of said receiving part.

* * * * *